(12) United States Patent
Tsyrganovich

(10) Patent No.: US 6,529,248 B1
(45) Date of Patent: Mar. 4, 2003

(54) METHOD AND APPARATUS FOR IMPROVED SIGNAL RESTORATION

(75) Inventor: Anatoliy V. Tsyrganovich, San Jose, CA (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 09/538,078

(22) Filed: Mar. 29, 2000

(51) Int. Cl.[7] ............ H04N 5/06; H04N 5/08; H04N 5/16; H04N 5/018

(52) U.S. Cl. ............ 348/691; 348/526; 348/695; 348/696; 348/697; 348/525; 348/521

(58) Field of Search ............ 348/691, 692, 348/693, 695, 696, 697, 698, 525, 521, 526, 527

(56) References Cited

U.S. PATENT DOCUMENTS

| | | | | |
|---|---|---|---|---|
| 4,323,923 A | * | 4/1982 | Reneau | 358/171 |
| 4,338,628 A | * | 7/1982 | Payne et al. | 380/213 |
| 4,400,717 A | * | 8/1983 | Southworth et al. | 348/22 |
| 4,516,042 A | * | 5/1985 | Nakamura | 307/546 |
| 4,571,615 A | * | 2/1986 | Robbins et al. | 380/225 |
| 4,620,227 A | * | 10/1986 | Levin et al. | 358/147 |
| 4,829,377 A | * | 5/1989 | Becker et al. | 358/147 |
| 4,980,768 A | * | 12/1990 | Stehle et al. | 358/213.16 |
| 5,087,973 A | * | 2/1992 | Kawahara | 358/167 |
| 5,105,276 A | * | 4/1992 | Schrock | 358/213.16 |
| 5,410,366 A | * | 4/1995 | Hostetler | 348/695 |
| 5,486,869 A | * | 1/1996 | Cooper | 348/525 |
| 5,760,844 A | * | 6/1998 | Jorden | 348/691 |
| 5,798,802 A | * | 8/1998 | Elmis et al. | 348/689 |
| 6,141,064 A | * | 10/2000 | Nayebi et al. | 348/659 |
| 6,198,822 B1 | * | 3/2001 | Doyle et al. | 380/210 |

* cited by examiner

*Primary Examiner*—John Miller
*Assistant Examiner*—Paulos Natnael
(74) *Attorney, Agent, or Firm*—Skjerven Morrill LLP

(57) ABSTRACT

A method and/or apparatus is capable of performing high accuracy digital level restoration with a high degree of noise immunity provided by a passive clamping stage.

15 Claims, 4 Drawing Sheets

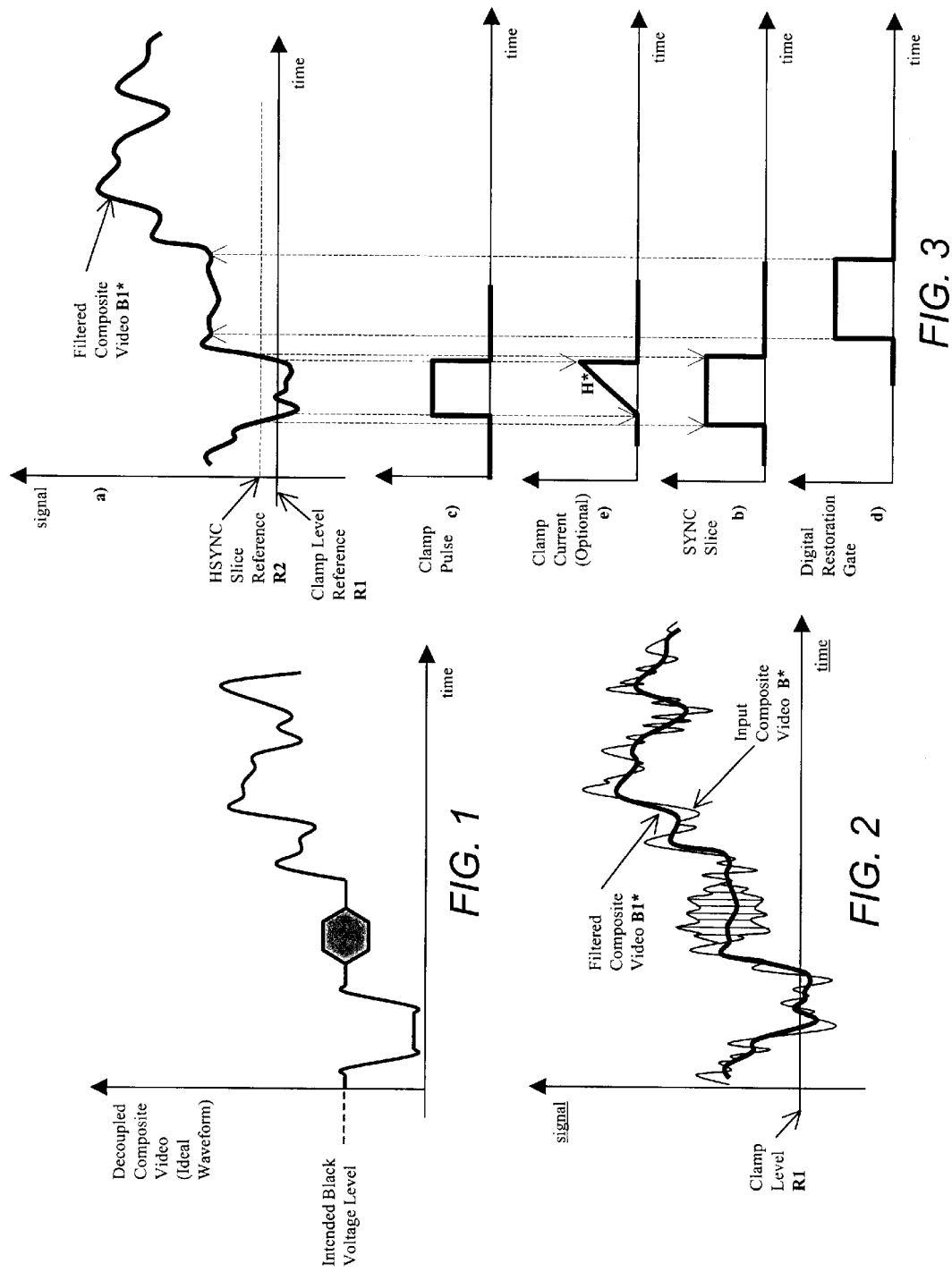

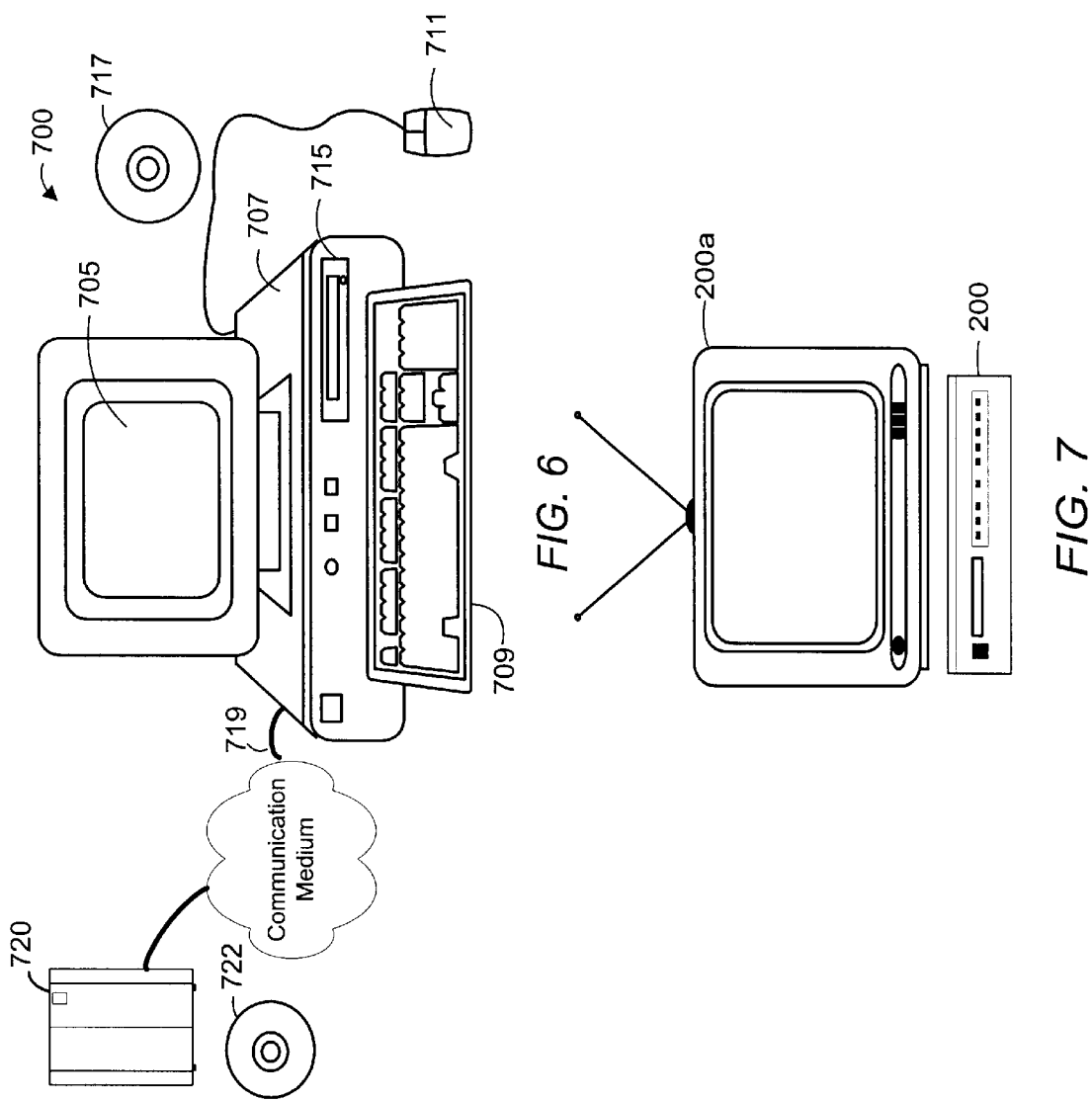

METHOD AND APPARATUS FOR IMPROVED SIGNAL RESTORATION

FIELD OF THE INVENTION

This invention relates to the field of signal processing. More particularly, the present invention relates to methods and apparatus for restoring a DC level and accurately finding a synchronization pulse in a noisy signal.

BACKGROUND OF THE INVENTION

The present invention is conveniently described in terms of restoring the DC (direct current) level (commonly referred to as the black level or blank level when discussing video signals) of a signal such as a television signal and detecting a synchronization pulse present in such a signal. However, as will be clear to those of skill in the art from the teachings herein, methods and/or apparatus according to the present invention have applications in other signal processing applications.

Restoring the DC (direct current) level of a capacitively coupled signal such as a television signal is a well-known problem with many proposed solutions.

Viewed from one perspective, DC restoration and finding the HSYNC synchronization pulse in a television signal together form a chicken-egg problem pair. In standard television signals, where the HSYNC start timing is known, DC level restoration (sometimes referred to in the art as "DC clamping," but herein referred to as restoration) can be done easily by timing from a horizontal synchronization pulse (HSYNC), due to the known timing relationship between HSYNC and where the black level in the input is located. However, in order to determine HSYNC start timing, it is generally desirable to know, at least to a close approximation, the DC level.

In some prior art systems, a variety of consecutive approaches have been used to address the twofold problem of determining the DC level and the start of the HSYNC pulse. Some of these approaches are referred to in the art as: passive clamping, HSYNC slicing, clamp gate generation, final clamping, etc. In some situations, passive clamping alone may be used. However, to achieve higher quality clamping several of these approaches may be used together. While these approaches work in some situations, especially in signals with little noise, problems can arise in real-world noisy signals.

A challenge for performing DC restoration in consumer television applications is the high noise to signal ratio these applications may encounter. Attempting to clamp a noisy video signal to the HSYNC tip (or bottom) can cause clamping to a noise value. This can lead to transposition of the noise spectrum into the low frequency domain, thus interfering with the horizontal scanning frequency and making that noise visible. Passive clamping additionally can cause clamping to noise spikes when the amplitude of the noise goes lower than the HSYNC tip.

There is a large body of art directed to receiving composite signals in general and directed specifically to DC restoration of a video composite signal. This art includes analog techniques, digital techniques, and hybrid techniques.

What is needed is a technique that can efficiently and effectively provide level restoration to a signal and detect a synchronization pulse even in the presence of noise.

SUMMARY OF THE INVENTION

The present invention involves reducing the susceptibility of a level restoration and pulse detection to noise. According to a further embodiment, a video signal is prefiltered by a low pass filter, and then HSYNC is sliced and may be recovered in a PLL, as is generally known in the art. Timed from HSYNC, a digital level restoration gate signal is generated and is used to activate a digital level restoration.

In a further specific embodiment, the invention provides increased noise immunity of a passive clamp in combination with digital level restoration with a high degree of noise suppression.

In a further aspect of embodiments of the invention, a control signal controls a passive clamping current source. In one embodiment, an output generated from the clamp current source rises gradually when clamping is active and when clamping is inactive, falls off quickly.

The present invention may be understood in the context of receiving a signal. An important application for the present invention, and an independent embodiment, is decoding a video signal, for example in a consumer television. However, using the teachings provided herein, it will be understood by those of skill in the art, that the methods and apparatus of the present invention could be advantageously used in other situations where a signal requires level restoration.

It will be further understood to those of skill in the art from the teachings herein that the present invention can be adapted and embodied in a number of types of digital processing systems, including all digital systems, hybrid systems, etc. The invention can also be embodied into consumer electronic devices such as televisions, video recorders, computers, etc. The invention can further be embodied as a method operating in a logic environment such as a general purpose signal process or simulator.

The invention will be better understood with reference to the following drawings and detailed descriptions. In different figures, similarly labeled items are intended to represent similar functions or signals within the scope of the teachings provided herein. In some of the drawings and detailed descriptions below, the present invention is described in terms of the important independent embodiment of hybrid circuitry that may be used in a video receiver to process video signals. This should not be taken to limit the invention, which, using the teachings provided herein, can be applied to other signal processing situations.

BRIEF DESCRIPTION OF THE DRAWINGS

FIG. 1 shows an idealized, decoupled composite waveform of a type for which the present invention can provide a level restoration.

FIG. 2 shows a noisy decoupled composite waveform and overlaying that a low pass filtered output of the noisy decoupled waveform.

FIGS. 3a–e show actions performed in generating a clamp pulse, clamp current, SYNC slice, and digital level restoration gate signal according to specific embodiments of the invention in response to a waveform.

FIG. 6 is a block diagram showing a representative example logic device in which the present invention may be embodied.

FIG. 7 is a block diagram showing a video display device in which the present invention may be embodied.

DESCRIPTIONS OF SPECIFIC EMBODIMENTS

FIG. 1 shows an idealized, decoupled composite waveform of a type for which the present invention can provide a level restoration. The intended "zero" voltage level (typically corresponding to a blank signal or black signal) is indicated. This waveform could be understood as a typical composite video signal as would be recognized in the art. As will be understood to those of skill in the art, the HSYNC pulse is the pulse below the blank level; shortly after the end of this pulse is the higher-frequency chroma-burst signal, indicated by the hexagon. Typically, this signal is preceded by a small black level portion (sometimes referred to as the breezeway) and may be followed by a short black level signal. Typically, the chroma burst is a higher frequency signal around the black level, with a DC component at the black level. After the color burst and any following black level signal is the active video signal.

Figure 4:
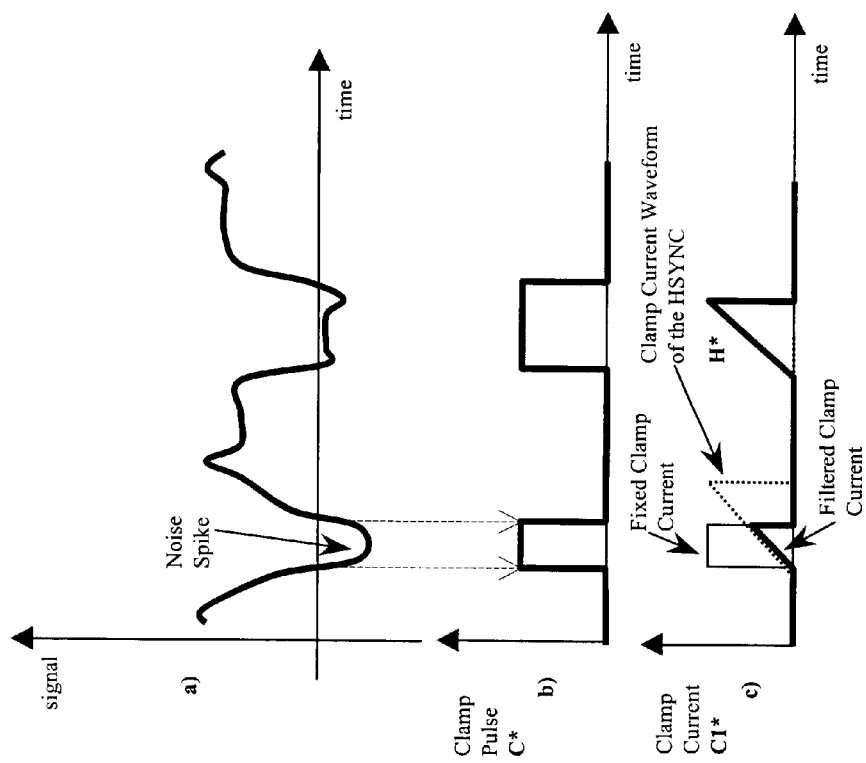
FIGS. 4a–c illustrate how, according to a further aspect of specific embodiments of the present invention, the influence of a clamp pulse triggered in response to a noise spike is reduced and illustrate that a digital level restoration gate is generated from a PLL recovered HSYNC signal.
Figure 5:
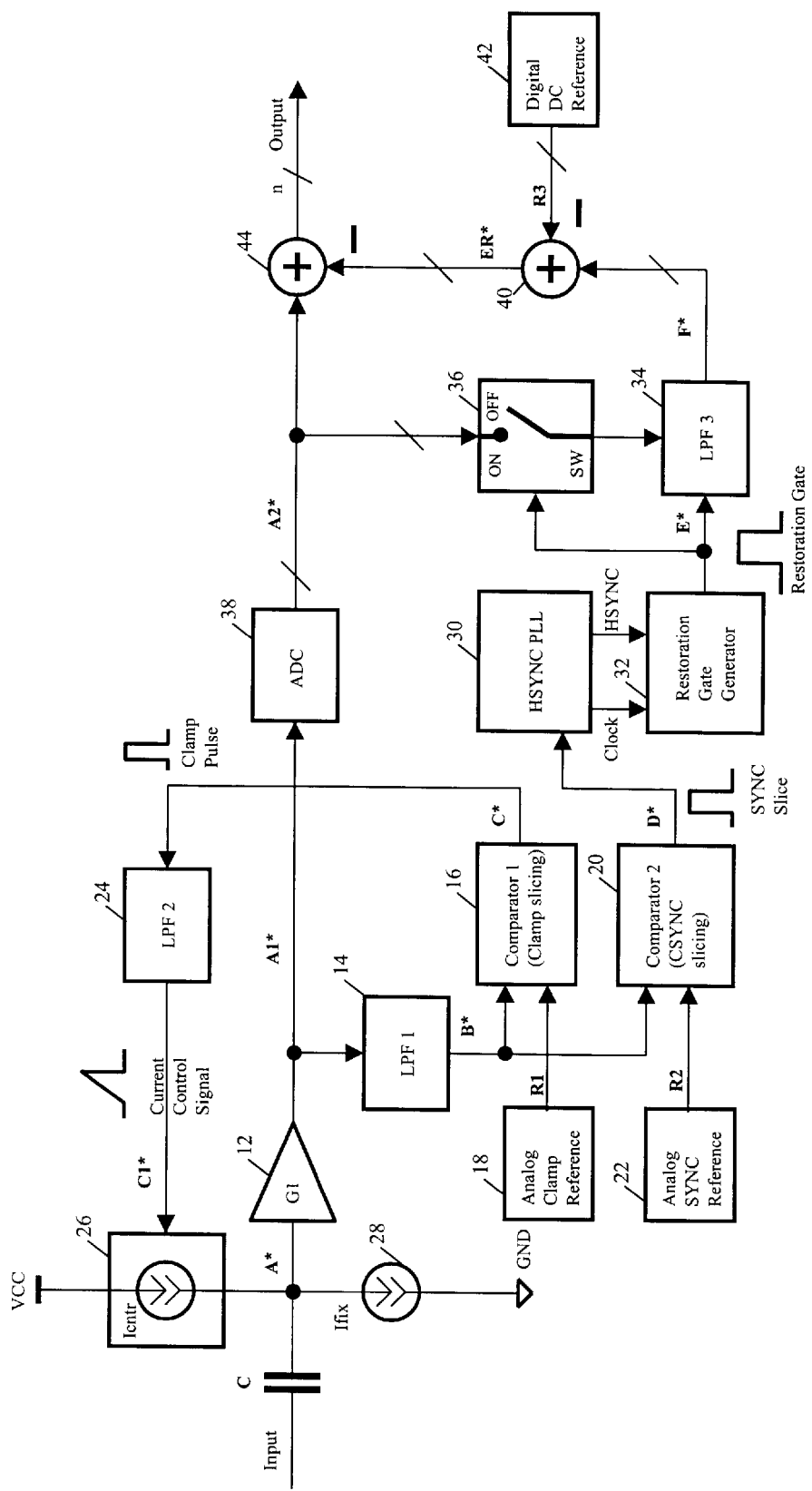
FIG. 5 is a block diagram illustrating improved restoration according to specific embodiments of the present invention.

The invention encompasses a method for signal processing and also encompasses circuit and device embodiments. A general method for signal processing may be understood from FIG. 3. FIG. 4 illustrates an optional additional aspect of the invention that provides additional noise rejection in the passive clamping stage. FIG. 5 may be understood as a general circuit element diagram or as a functional block diagram indicating the function actions of a specific embodiment.

To aid in understanding the invention, signals in FIG. 1 to FIG. 4 are labeled with labels corresponding to the diagram in FIG. 5, however, it will be apparent to those of skill in the art from the teachings herein that the signal processing operations described herein can be performed in a variety of different ways, including signal processing apparatus or circuits different from that most immediately suggested by FIG. 5. It will be further understood to those with skill in the art from the teachings herein that the elements shown in FIG. 5 could be understood either as circuit elements, or some or all of the elements could be understood as functional elements in a signal processing apparatus such as a digital or hybrid signal processor.

FIG. 2 shows a noisy decoupled composite waveform and overlaying that a low pass filtered output of the noisy decoupled waveform. The input composite signal shown represents a more "real-world" input signal, with high frequency chroma and noise as shown. As is known in the art, this signal may be low pass filtered (such as by LPF1 in FIG. 5) to produce a signal like the one shown in heavy black in FIG. 2. This low pass filtering, as shown, in part has the effect of eliminating the high-frequency component of the burst signal, therefore leaving a black level (or blank level) signal in the burst interval. According to embodiments of the invention, and as is known in the art, it is to this blank signal that level restoration is performed.

FIG. 2 also indicates a clamp level reference voltage. This is a reference voltage value (which could be analog or digital) that is set to provide a predefined voltage level to which the bottom of the HSYNC pulse will be clamped in an initial passive clamping stage. This initial clamping, according to the invention, forces the bottom of the HSYNC pulse to a known level so as to improve detection of HSYNC in generating an HSYNC slice. As will be understood in the art, the bottom of HSYNC as received in a composite signal may not have a well-defined relationship to the blank level. According to the present invention, HSYNC bottom value is clamped to a known level to improve HSYNC slice detection and DC level restoration.

FIGS. 3a–e show actions performed in generating a clamp pulse, clamp current, SYNC slice, and digital level restoration gate signal according to specific embodiments of the invention in response to a waveform.

FIG. 3a shows the LPF filtered input signal of FIG. 2.

FIG. 3b shows a SYNC Slice is initiated by a comparison to a SYNC reference level R2, and begins when the input signal falls below the reference level and continues until the input signal rises above a reference level.

As shown in FIG. 3c, a clamp pulse is initiated when the input signal drops below the clamp level reference R1. This clamp pulse signal acts to clamp the bottom of the HSYNC input signal to a predefined level and generally acts to raise the voltage level of the entire input. Typically, in many applications, the clamp is designed to adjust the signal DC level over several SYNC lines to a level such that the bottom of HSYNC in an input stage will be at a known level. With the bottom of HSYNC forced to a known level, a more precise and reliable SYNC slice can be generated by comparison with R2.

Once the SYNC slice is determined, it may be used to generate a digital restoration gate signal, as shown in FIG. 3d. As described below, this signal may be conditioned by a phase-lock-loop function to improve the signal's stability and to increase noise immunity and may be generated by a generation function that will ensure the signal is timed at the correct interval from HSYNC to occur during the black level. The digital restoration gate may also have delay added to compensate for signal propagation delays.

Shown in FIG. 3e is an optional clamp current signal that may be used to control passive clamping to HSYNC during the initial stage. As explained below, this signal may advantageously be used for passive clamping of the input HSYNC level, rather than using the clamp pulse for passive clamping.

The signals in FIGS. 3b–e are shown with reference to an inactive level, which for typical active high signals may be 0. It will be understood that any of these signals could be active low signals, in which case the inactive voltage level could be a positive voltage. It will also be understood that for digital signal processing, FIGS. 3b–e could represent active and inactive logic states of the signals.

Increasing Noise Immunity of Passive Clamping

FIGS. 4a–c illustrate how, according to a further aspect of specific embodiments of the present invention, the influence of a clamp pulse triggered in response to a noise spike is reduced and illustrate that a digital level restoration gate is generated from a PLL recovered HSYNC signal. As shown in FIG. 4a, and as known in the art, one or more substantial noise spikes can be present in an input signal, even after filtering. In some cases, this noise spike may dip to a lower level that the HSYNC pulse. If this noise spike is sufficiently large, it can cause an unwanted clamp pulse, such as shown in FIG. 4b. If this clamp pulse is allowed to have a substantial impact on clamping at the input, the clamped-to level will be incorrect and may disturb accurate detection of the HSYNC signal for SYNC slice. Even if the erroneous clamp pulse is of short duration, if there are many closely spaced short erroneous pluses, the cumulative effect on the clamped level at the input stage may lead to poor SYNC detection.

According to this aspect of this embodiment of the invention, a clamping pulse signal such as shown in FIG. 4b is integrated (or otherwise filtered or processed) to provide a more gradually rising signal such as shown in FIG. 4c. It is this gradually rising signal that is used to force clamping of HSYNC at the input. A gradually rising signal is particular advantageous because analysis shows that most noise spikes are of short duration. Therefore, most noise spikes will have a relatively small effect on the passive clamping when a gradually increasing current is used. Even in the presence of a very high number of noise spikes, if the spikes are of short duration, the cumulative effect on the clamping level will be substantially decreased by the gradually rising clamp control current. Therefore, there is less chance that an incorrect detection of HSYNC will result from the noise signal.

Furthermore, assuming that the noise spike is not of sufficient duration (approaching the duration of HSYNC), a gradually rising clamp current can increase the noise immunity of an HSYNC PLL and will thus reduce the chance that noise spikes will cause the HSYNC PLL to phase shift or output an erroneous signal.

The present invention has thus far been described in terms of general methods. The previous description is believed to be a full and complete description sufficient to allow an ordinary practitioner in the art to make and use the invention. It will be understood to those of skill in the art from the teachings provided herein that the described invention can be implemented in a wide variety of specific programming, logical processing, or signal processing environments.

What follows is a description of an example embodiment that embodies various aspects of the present invention. This following discussion is included, in part, in order to disclose particularly preferred modes presently contemplated for practicing the invention. It is intended, however, that the previous discussion and the claims not be limited by examples provided herein. It is further intended that the attached claims be read broadly in light of the teachings provided herein. Where specific examples are described in detail, no inference should be drawn to exclude other examples known in the are or to exclude examples described or mentioned briefly from the broad description of the invention or the language of the claims. It is therefore intended that the invention not be limited except as provided in the attached claims and equivalents thereof.

Description of Specific Example Embodiment

FIG. 5 is a block diagram illustrating improved restoration according to specific embodiments of the present invention. The figure can be understood in one embodiment as a combination of digital and analog circuit elements. The figure can also be understood as illustrating functional blocks comprising methods according to specific embodiments of the invention. It will also be understood to those of skill in the art, using the teachings herein, that one or more of the components shown in FIG. 5 may be implemented by logic routines in a signal processor.

FIG. 5 in one embodiment can be understood to comprise a passive clamping feedback loop at an input stage, followed by a digital level restoration, where the digital level restoration is gated by a SYNC slice detected at the passive clamping stage and conditioned by a PLL. FIG. 5 can generally be understood to have the following functional components:

Passive Clamping

An INPUT signal is coupled through capacitance C to a node A*. As will be understood in the art, C acts to reject the DC component of the input, but will pass signals above the band pass frequency of C. However, the DC level of the signal that is passed is not determined and will vary with the signal. As know in the art, C is used to separate the DC level at the input from the DC level in the rest of the circuit.

A* is coupled between current sources Icntr 26 and Ifix 28. Ifix provides a fixed leakage or draining current from A* to ground, providing a fixed gradual pull down. Icntr is a current source that injects current into A* during a clamping period, and that is controlled by a feedback path. This configuration will be understood from the teachings provided herein as a passive clamping configuration.

A* is separated from other circuit operation by a high input impedance follower G1 12. The output of G1 is A1*. A1* is filtered by LPF1 14 to produce an output B*. LPF1 acts to damp the color burst signal and therefore provide DC level to which restoration will be applied.

A passive clamping control signal (clamp pulse) is generated by comparing B* to a reference level R1 18 in comparator 16. In a specific embodiment, whenever B* falls below R1, a clamp pulse is generated at C*. This signal acts to control Icntr and thereby to inject current into A*, causing the DC level of A* to increase. Generally, A* will increase until the bottom of the HSYNC pulse reaches R1 (or a level related to R1).

Icntr acts to compensate Ifix and the DC offset that occurs due to decoupling provided by capacitor C. Ifix is substantially smaller than Icntr, for example, in one specific embodiment it is about 50 times less than Icntr. Thus a small portion of Icntr is able to compensate Ifix and provide appropriate compensation of the DC shift caused by DC content of the input signal.

SYNC Slicing and Improved Passive Clamping

B* is also compared to reference level R2 (generated by 22) in comparator 20, to generate a SYNC slice. R2 is generally effectively set at a level different from R1, so as to capture a fuller width of the HSYNC component of the input. This, however, can create a problem if there are substantial noise spikes, particularly lower that the bottom of the HSYNC input. In the presence of such noise spikes, clamp pulses may be generated that cause the signal at node A* to rise so high that the comparison with R2 does not detect the SYNC slice.

To reduce this problem, in one embodiment of the invention, LPF2 24 is optionally used to produce a gradually rising current control signal C1*. As described above, a gradually rising current control will substantially reduce the impact of short noise spikes on the level at A*. Thus, it is less likely that the level at A* will rise enough as a result of noise to interfere with proper SYNC slicing.

HSYNC Recovery in PLL

As will be understood in the art, the SYNC slice signal at D* may be conditioned by an HSYNC PLL to produce a more stable HSYNC signal. In the particular embodiment shown, an HSYNC PLL 30 outputs a CLOCK signal and an HSYNC signal. The CLOCK signal is typically of a frequency many times higher than HSYNC and may be used in a DC RESTORATION GATE GENERATOR 32 to correctly time a DC restoration signal E* from the HSYNC signal, so that the signal will occur during the black level portion of the signal at A2*. The RESTORATION GATE GENERATOR may also compensate for delays in the circuit prior to the DC restoration signal or other delays as will be understood to those of skill in the art from the teachings herein.

Digital DC Restoration

The input signal A1* is converted to a digital signal A2* by an ADC 38. When the restoration gate signal (E*) is active, it closes switch SW 36 (and optionally clocks LPF3.) LPF3 34 acts to filter and hold the digital level of the input signal A2* during the detected blank level portion of the input signal.

In one embodiment, LPF3 is a digital low pass filter with a frequency response that dramatically rejects (approximately >60 dB) subcarrier frequencies of both NTSC (3.58 Mhz) and PAL (4.43 Mhz) standards.

Thus, according to the invention, until the next DC Restoration Gate, Digital DC reference signal R3 (from a reference 42) is subtracted from (or, in other embodiments, otherwise combined with) F* in (combination operator 40) resulting in an error value ER*. This error value represents the amount that the digital DC value detected at A2* is different from the desired digital DC level. The error amount is removed from A2* (combination operator 44) to compensate for a DC content in A2* and to provide the level-restored OUTPUT signal.

As can be seen from the above, as a result of the present invention, the DC value of the output signal is restored in a robust way. First of all, the decoupled signal is roughly clamped to the reference level R1 using a simple feedback passive clamp, and then composite SYNC is sliced. The invention takes into account that SYNC may be unstable and corrupted by noise and therefore a robust horizontal SYNC is restored in HSYNC PLL.

In a specific embodiment, a number of the signals shown in FIG. 5 can be understood as multi-bit digital signals, as indicated by the slash through the signal line. While, in typical circuits, each of these signals will have the same bit width, such as N bits, In other embodiments, the digital signals may have different bit widths and may have different bit widths from each other. For example, the signals supplied at F*, R3, and/or ER* could have fewer bits (and less precision) than the output, and could act to correct only a high order portion of the output.

The pulse signals shown could each be understood as analog pulse signals or as digital active/inactive signals.

Embodiment in a Programmed Information Appliance or Signal Handling Devices

FIG. 6 is a block diagram showing a representative example logic device in which the present invention may be embodied. As will be understood to practitioners in the art from the teachings provided herein, in specific embodiments, the invention can be implemented in hardware and/or software. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a user accesses through a communication medium in order to download a program component.

FIG. 6 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD) or a programmable device with hybrid analog circuitry. In such a case, the invention may be embodied in a computer understandable descriptor language which may be used to create an ASIC or PLD that operates as herein described.

The invention also may be embodied within the circuitry or logic processes of other digital apparatus, such as televisions, video recorder devices, television reception circuit boards, image editing equipment, etc. Two such apparatus are shown in FIG. 9 (a video recorder) and FIG. 10 (a television or display). This embodiment may also include a controller 611.

In the case of a television or display device, the invention may allow for improved reception and display of an image that is transmitted or stored as a composite signal.

In one embodiment, the present invention comprises a video display device such as a TV, VCR player, or set-top decoder, with a DC restoration as described above. FIG. 7 is an illustrative block diagram of such a device, showing a television receiving device 200 for receiving a composite video signal. As will be understood from the teachings herein to those of skill in the art, this receiving device could represent a VCR with reception capabilities, a stand-alone receiver, a computer bus card with receiver circuitry, etc. According to the present invention, this receiving device includes methods and/or apparatus as described herein for improved level restoration and sync pulse detection. FIG. 7 also shows a television 200a, which could be understood as a stand-alone consumer television with receiver or signal decoder circuitry that according to the present invention includes methods and/or apparatus as described herein for improved level restoration and sync pulse detection.

Other Embodiments

The invention has now been described with reference to specific embodiments. Other embodiments will be apparent to those of skill in the art.

It should be understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein are hereby incorporated by reference in their entirety for all purposes.

What is claimed is:

1. A method of level restoration comprising:
   comparing an input signal to a clamp reference to generate a clamp pulse;

using said clamp pulse to perform passive clamping at said input signal to a reference level;

comparing said input signal to a sync reference to generate a sync slice;

conditioning said sync slice to obtain a recovered HSYNC signal;

obtaining a digital representation of said input signal;

using said HSYNC to generate a digital restoration gate signal, said digital restoration gate signal timed from said HSYNC signal to capture a restoration level of said digital representation;

combining said restoration level and a restoration reference to generate an error signal; and combining said error signal to said digital representation of said input signal restoration to generate a level restored output signal.

2. The method according to claim 1 further comprising:

prior to comparing said input signal to said clamp reference and said sync reference, passing said input signal through a high impedance follower.

3. The method according to claim 1 further comprising:

prior to comparing said input signal to said clamp and said sync references, low pass filtering said input signal to smooth a high frequency component of said input signal.

4. The method according to claim 1 wherein said passive clamping at said input signal is performed by a controlled current source, said current source responsive to said clamp pulse.

5. The method according to claim 1 wherein said conditioning is performed by a phase lock loop, said phase lock loop outputting a recovered HSYNC signal and a clock signal.

6. The method according to claim 1 wherein using said clamp pulse to perform passive clamping at said input signal comprises:

using said clamp pulse to generate a gradually rising signal; and using said gradually rising signal to perform clamping at said input signal, such that clamping at said input signal is weak during an initial part of said clamp pulse and becomes stronger as said clamp pulse continues.

7. The method according to claim 1 wherein said restoration level of said digital representation is captured by a low pass filter.

8. The method according to claim 6 wherein said gradually rising signal is generated by an integration of said clamp pulse.

9. A level restoration and pulse detection apparatus comprising:

an analog passive clamp stage able to clamp the bottom of an analog input signal to a pulse reference;

a comparator generating a pulse slice from a clamped input signal;

a gate generator generating a digital restoration gate signal from said slice;

an analog to digital converter converting a clamped analog input signal to a digital signal;

a register gated by said digital restoration signal for holding an input black level;

a digital DC reference signal input; and an error signal generator for combining said digital DC reference signal with said input black level and thereby restoring a DC level to an output digital composite signal.

10. The apparatus according to claim 9 further comprising:

a phase lock loop for conditioning said pulse slice prior to its use by said gate generator.

11. The apparatus according to claim 9 further comprising:

a clamp comparator generating a clamp pulse.

12. The apparatus according to claim 9 further comprising:

a clamp control current filter producing a gradually rising clamp control current.

13. The apparatus according to claim 9 further comprising:

a low pass filter associated with said hold register.

14. A video composite signal receiver comprising:

an interface for accepting an input composite video signal;

a passive clamp stage able to clamp the bottom of said input composite video signal to a pulse reference;

a comparator generating a pulse slice from a clamped input signal;

a gate generator generating a digital restoration gate signal from said slice;

a register gated by said digital restoration signal for holding an input black level;

a digital reference signal input; and an error signal generator for combining said digital DC reference signal with said input black level and thereby restoring a DC level to an output digital composite signal.

15. The apparatus according to claim 14 further comprising:

a display for displaying said output digital composite signal.

* * * * *